United States Patent
Song et al.

(10) Patent No.: US 12,154,605 B1
(45) Date of Patent: Nov. 26, 2024

(54) DIGITAL TIMING RECOVERY FOR SERVO OPERATIONS DURING START-UP MODE

(71) Applicant: Marvell Asia Pte Ltd, Singapore (SG)

(72) Inventors: Hongxin Song, Sunnyvale, CA (US); Michael Madden, Mountain View, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/480,587

(22) Filed: Oct. 4, 2023

Related U.S. Application Data

(60) Provisional application No. 63/415,593, filed on Oct. 12, 2022.

(51) Int. Cl.
  *G11B 20/10* (2006.01)
  *G11B 5/596* (2006.01)

(52) U.S. Cl.
  CPC ...... *G11B 5/59655* (2013.01); *G11B 5/59688* (2013.01)

(58) Field of Classification Search
  CPC .............. G11B 20/10; G11B 20/10222; G11B 20/10212; G11B 5/09; G11B 20/10268; G11B 2020/1222; G11B 20/1217; G11B 5/59627; G11B 2020/1229; G11B 2020/1238
  USPC .......................................................... 360/51
  See application file for complete search history.

(56) References Cited

U.S. PATENT DOCUMENTS 7,206,149 B2 * 4/2007 Ozdemir ............ G11B 5/59633

* cited by examiner

*Primary Examiner* — Nabil Z Hindi

(57) ABSTRACT

A method of recovering a servo write frequency, to read servo wedge data from a rotating magnetic storage medium having at least one servo wedge that includes a servo preamble written at a known preamble frequency, includes analyzing samples of data read from the rotating magnetic storage medium to identify samples in which energy at the known preamble frequency exceeds a predetermined threshold, declaring the location of the servo preamble based on the identification of the samples in which energy at the known preamble frequency exceeds the predetermined threshold, deriving a phase angle from the samples in which the energy at the known preamble frequency exceeds the predetermined threshold, updating an accumulated phase angle using the derived phase angle, and using the updated accumulated phase angle to start a timing recovery loop to recover the servo write frequency. The analyzing and deriving may be performed using a spectral analysis operation.

22 Claims, 6 Drawing Sheets

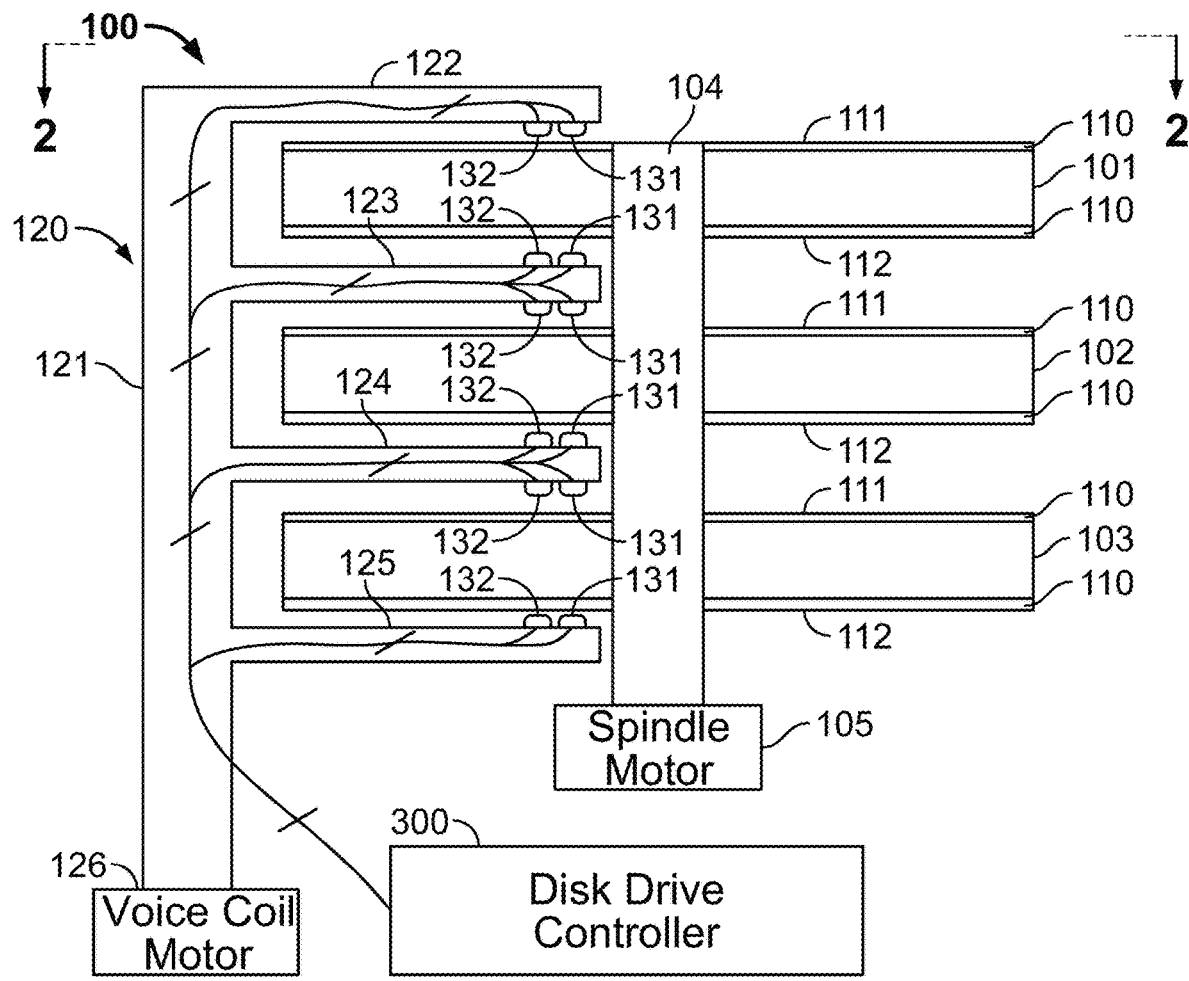
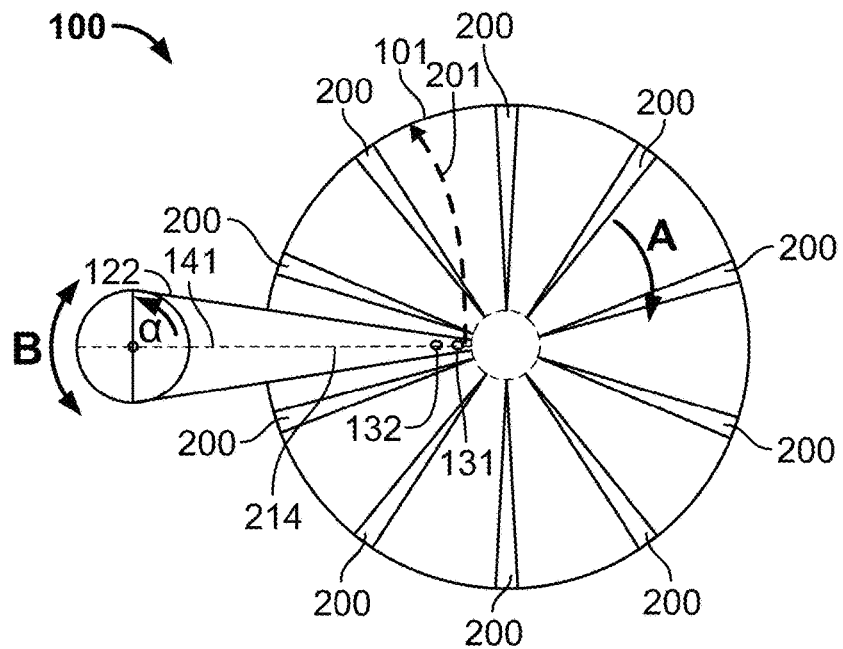
FIG. 1
FIG. 2

DIGITAL TIMING RECOVERY FOR SERVO OPERATIONS DURING START-UP MODE

CROSS REFERENCE TO RELATED APPLICATION

This disclosure claims the benefit of commonly-assigned U.S. Provisional Patent Application No. 63/415,593, filed Oct. 12, 2022, which is hereby incorporated by reference herein in its entirety.

FIELD OF USE

This disclosure relates to digital timing recovery for use in servo operations in a hard disk drive. More particularly, this disclosure relates to a digital timing recovery technique for hard disk drive servo operations during start-up mode.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

In magnetic recording, as one example, reading and writing are performed by one or more heads that move relative to the surface of a storage medium. Many magnetic disk drives, for example, include a plurality of individual disks, or "platters," which may be two-sided—i.e., each platter can store data on each of its two sides. Therefore, such a disk drive would have at least two heads for each platter. Indeed, for each platter, there is normally at least one write head and at least one separate read head, so that such a disk drive normally has at least four heads per platter.

In a common configuration, all of the heads in a given disk drive are mounted on arms attached to a common actuator that controls the radial position of the heads (an angular, tangential or circumferential component of motion is provided by the rotation of the platters relative to the heads). This is true whether there is one or many platters, and one or multiple heads per platter.

In order to control the radial position selected by the actuator, each surface of each platter has distributed upon its positional information referred to as "servo" data. The servo data are commonly distributed in spaced-apart servo "wedges" (generally spaced equiangularly) on the platter surface. By reading the servo data as each servo wedge passes under the read head, the disk drive controller can determine the precise radial and angular position of the head and can feed back that determination to control the position of the read head or the write head, depending on the required operation.

As part of reading the servo wedge, the servo write frequency is recovered from the servo data by interpolation in a timing recovery loop. During steady-state run-time operation, where the locations of the servo wedges have already been determined, phase error can be estimated from the servo preamble and the estimated phase error can be used in a zero-phase start (ZPS) operation to initialize the timing recovery loop. But during start-up operation, when the servo wedge locations are not yet well-determined, ZPS may not be possible, in which case the timing recovery loop may be initialized with a random phase error. While the timing recovery loop may eventually converge even if initialized with a random phase error, the time available for convergence is the duration of the servo preamble. Depending on the preamble length, and the particular random phase error chosen, there may not be sufficient time for the timing recovery loop to converge.

SUMMARY

According to implementations of the subject matter of this disclosure, a method of recovering a servo write frequency, to read servo wedge data from a rotating magnetic storage medium having at least one servo wedge that includes a servo preamble written at a known preamble frequency, includes analyzing samples of data read from the rotating magnetic storage medium to identify samples in which energy at the known preamble frequency exceeds a predetermined threshold, declaring location of the servo preamble based on the identification of the samples in which energy at the known preamble frequency exceeds the predetermined threshold, deriving a phase angle from the samples in which the energy at the known preamble frequency exceeds the predetermined threshold, updating an accumulated phase angle using the derived phase angle, and using the updated accumulated phase angle to start a timing recovery loop to recover the servo write frequency.

In a first implementation of such a method, the analyzing and the deriving may be performed using a spectral analysis operation.

According to a first aspect of that first implementation, the spectral analysis operation may include a Discrete Fourier Transform operation.

According to a second aspect of that first implementation, the spectral analysis may be performed on groups of samples grouped into overlapping windows, each window being shorter than the servo preamble.

In a first instance of that second aspect, respective starting samples of adjacent overlapping windows may be separated by an integral multiple of a period of the known preamble frequency.

In a second implementation of such a method, identifying the samples in which the energy at the known preamble frequency exceeds the predetermined threshold may include, for each individual sample, determining a total amount of energy in the individual sample, determining, in the individual sample, an amount of energy in the individual sample at the servo preamble frequency, and comparing the amount of energy at the servo preamble frequency in the individual sample to the total amount of energy in the individual sample.

According to a first aspect of that second implementation, comparing the amount of energy at the servo preamble frequency in the individual sample to the total amount of energy in the individual sample may include determining a ratio of the amount of energy at the servo preamble frequency in the individual sample to the total amount of energy in the individual sample, and comparing the ratio to a predetermined threshold.

According to a second aspect of that second implementation, declaring the location may include observing a first predetermined number of consecutive samples for which the ratio at least equals the predetermined threshold.

A first instance of that second aspect may further include declaring an end of the servo preamble upon observing a second predetermined number of consecutive samples for which the ratio is less than the predetermined threshold.

In a third implementation of such a method, updating an accumulated phase angle using the derived phase angle may include adding to the accumulated phase angle a weighted difference between the derived phase angle and the accumulated phase angle.

According to a first aspect of that third implementation, the difference between the derived phase angle and the accumulated phase angle may be weighted by a loop constant.

According to implementations of the subject matter of this disclosure, a storage device includes a rotating magnetic storage medium having at least one servo wedge that includes a servo preamble written at a known preamble frequency, and a read channel controller configured to recover a servo write frequency for reading servo wedge data from the rotating magnetic storage medium, the read channel controller including circuitry configured to analyze samples of data read from the rotating magnetic storage medium to identify samples in which energy at the known preamble frequency exceeds a predetermined threshold, circuitry configured to declare location of the servo preamble based on the identification of the samples in which energy at the known preamble frequency exceeds the predetermined threshold, circuitry configured to derive a phase angle from the samples in which the energy at the known preamble frequency exceeds the predetermined threshold, circuitry configured to update an accumulated phase angle using the derived phase angle, and circuitry configured to use the derived phase angle to start a timing recovery loop to recover the servo write frequency.

In a first implementation of such a storage device, the circuitry configured to analyze and the circuitry configured to derive may be configured to perform a spectral analysis operation.

According to a first aspect of that first implementation, the circuitry configured to analyze and the circuitry configured to derive may be configured to perform a Discrete Fourier Transform operation.

According to a second aspect of that first implementation, the circuitry configured to analyze and the circuitry configured to derive may be configured to perform the spectral analysis on groups of samples grouped into overlapping windows, each window being shorter than the servo preamble.

In a first instance of that second aspect, the circuitry configured to analyze and the circuitry configured to derive may be configured to perform the spectral analysis on groups of samples grouped into overlapping windows, respective starting samples of adjacent overlapping windows being separated by an integral multiple of a period of the known preamble frequency.

In a second implementation of such a storage device, the circuitry configured to analyze samples of data read from the rotating magnetic storage medium to identify samples in which energy at the known preamble frequency exceeds a predetermined threshold may be configured to, for each individual sample, determine a total amount of energy in the individual sample, determine, in the individual sample, an amount of energy at the servo preamble frequency, and compare the amount of energy at the servo preamble frequency in the individual sample to the total amount of energy in the individual sample.

According to a first aspect of that second implementation, the circuitry configured to analyze samples of data read from the rotating magnetic storage medium, to identify samples in which energy at the known preamble frequency exceeds a predetermined threshold, may be configured to compare the amount of energy at the servo preamble frequency in the individual sample to the total amount of energy in the individual sample by determining a ratio of the amount of energy at the servo preamble frequency in the individual sample to the total amount of energy in the individual sample, and comparing the ratio to a predetermined threshold.

According to a second aspect of that second implementation, the circuitry configured to declare the location of the servo preamble, based on the identification of the samples in which energy at the known preamble frequency exceeds a predetermined threshold, may be configured to observe a first predetermined number of consecutive samples for which the ratio at least equals the predetermined threshold.

In a first instance of that second aspect, the read channel controller may further include circuitry configured to declare an end of the servo preamble upon observing a second predetermined number of consecutive samples for which the ratio is less than the predetermined threshold.

In a third implementation of such a storage device, the circuitry configured to update the accumulated phase angle using the derived phase angle may be configured to add to the accumulated phase angle a weighted difference between the derived phase angle and the accumulated phase angle.

According to first aspect of that third implementation, the circuitry configured to update the accumulated phase angle using the derived phase angle may be configured to add to the accumulated phase angle a difference, between the derived phase angle and the accumulated phase angle, that is weighted by a loop constant.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which:

FIGS. 1 and 2 show an example of a disk drive 100 with which the subject matter of the present disclosure may be used;

DETAILED DESCRIPTION

Figure 3:
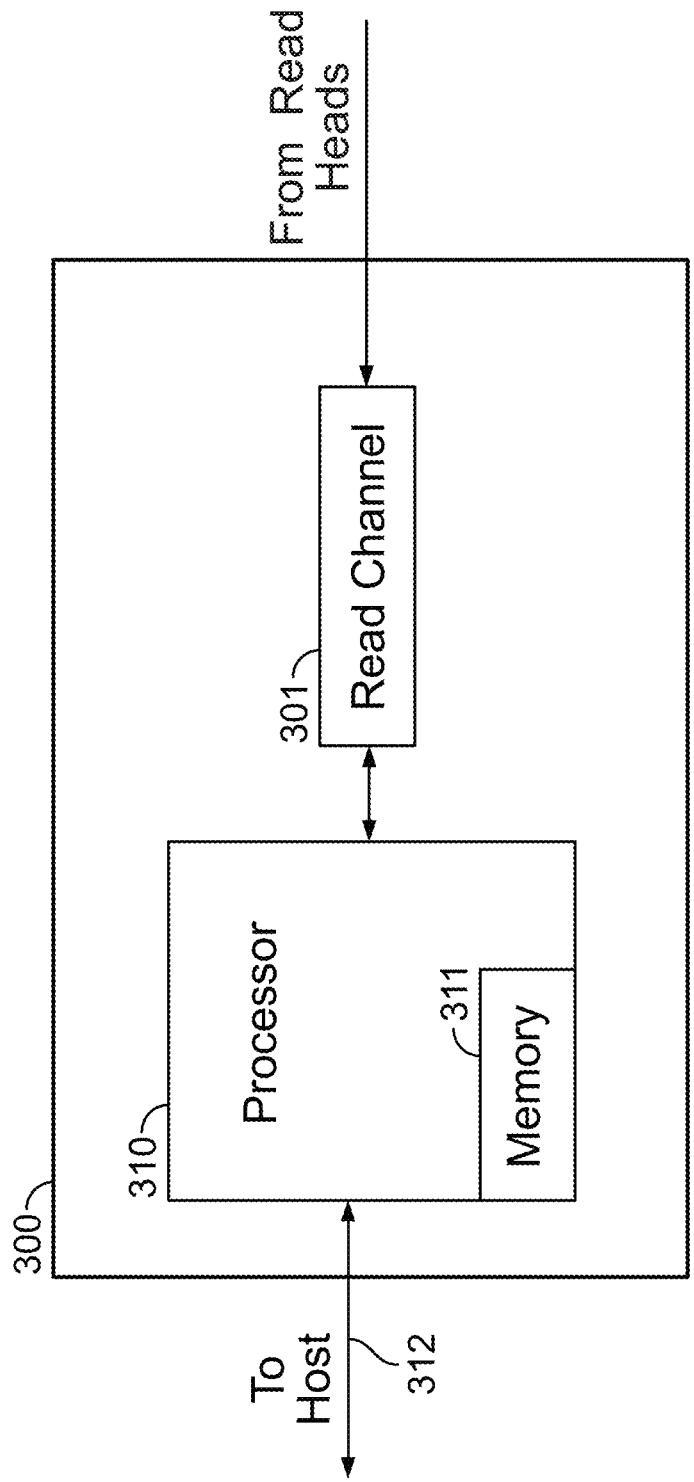
FIG. 3 is a diagram of a hard drive controller that may be used in a disk drive as in FIGS. 1 and 2 in implementations of the subject matter of this disclosure.

FIGS. 1 and 2 show an example of a disk drive 100 with which the subject matter of the present disclosure may be used. In this particular example, disk drive 100 has three platters 101, 102, 103, although any number of platters may be included in a disk drive with which the subject matter of the present disclosure may be used. As shown, each platter 101, 102, 103 has, on each of its upper and lower surfaces 111, 112, a coating 110 made from a material in which data can be stored, e.g., magnetically. The present disclosure also is relevant to a disk drive in which one or more platters includes coating 110 on only one of its surfaces, but such a disk drive would store less data in the same volume than a disk drive with two-sided platters. The platters 101-103 are mounted on a rotatable spindle 104. Spindle motor 105 rotates spindle 104 to rotate platters 101-103 in the direction of arrow A (FIG. 2). Although spindle motor 105 is shown connected directly to spindle 104, in some cases spindle motor 105 may be located off-axis of spindle 104 and would be connected to spindle 104 through belts or gears (not shown).

Read/write head assembly 120 includes an actuator 121 that bears arms 122-125, one of which is disposed adjacent to each surface 111, 112 of a platter 101, 102, 103 that has a memory storage coating 110. In this example, with heads on both surfaces of each of arms 123, 124, that amounts to four arms 122-125, but in the single-sided platter example discussed above, there would be only three arms. In other examples, the number of arms would increase or decrease along with the number of platters.

Each arm 122-125 bears, at or near its end furthest from actuator 121, and on both its upper and lower surfaces in the case of arms 123, 124, a plurality of read heads/sensors and write heads. In this case, two sensors 131, 132 are shown, and may represent, respectively, read and write sensors, although it in some applications each arm 123, 124 may bear more than one read head/sensor and more than one write head (not shown). In the configuration shown in FIGS. 1 and 2, arms 122-125 are aligned along a radius of platters 101-103, bringing heads 131, 132 as close as they can get to spindle 104. It should be noted that FIGS. 1 and 2 are schematic only and not to scale. Normally, the spindle diameter would be larger relative to the disk diameter. Moreover, arms 122-125 normally cannot point directly at the center of the disk.

A motor 126, commonly referred to as a "voice-coil motor," rotates actuator 121 back and forth along the directions of arrow B (FIG. 2) to move the heads 131, 132 along the path indicated by dashed arrow 201. The motion of actuator 121 thus changes both the radial and circumferential positions of heads 131, 132, but the circumferential positional change is relatively unimportant insofar as the platters are rotating. The motion of actuator 121 thus is used to control the radial position of heads 131, 132.

The location on surface 111 of platter 101 (the other surfaces are similar) of the aforementioned wedges is shown in FIG. 2. Each servo wedge 200 includes data identifying it by wedge index, track index, or sector number (to give an angular, tangential or circumferential position) and by data representing, at each point along a radius of the platter, the distance from spindle 104.

Each of read heads 131, 132 is connected to a read channel 301 of a hard drive controller 300 (there is a corresponding write channel 302) (FIG. 3). Hard drive controller 300 also includes a processor 310 and memory 311, as well as a connection 312 to a host processor (not shown). A servo control loop in hard drive controller 300 uses position error sensor (PES) data and the servo wedge data to keep the heads 131, 132 on track.

As noted above, as part of reading the servo wedge, the servo write frequency is recovered from the servo data by interpolation in a timing recovery loop. The recovered servo frequency is then used to read the servo data and find the servo sync mark. The interpolation process relies on determination of phase error. During steady-state operation, where the locations of the servo wedges have already been determined, phase error can be estimated from the servo preamble and the estimated phase error can be used in a zero-phase start (ZPS) operation to initialize the timing recovery loop. But during start-up operation, when the servo wedge locations are not yet well-determined, ZPS may not be possible, in which case the timing recovery loop typically may be initialized with a random phase error. While the timing recovery loop may eventually converge even if initialized with a random phase error, the time available for convergence is the duration of the servo preamble. Depending on the preamble length, and the particular random phase error chosen, there may not be sufficient time for the timing recovery loop to converge, especially considering that, for other reasons, it is desirable to keep the servo preamble as short as possible.

Therefore, implementations of the subject matter of this disclosure are provided to allow the timing recovery loop to converge during the duration of the servo preamble, by detecting the servo preamble sufficiently quickly. The servo preamble may be detected by identifying signal energy at the preamble frequency, which is known. The signal energy at the preamble frequency may be identified in a digital timing recovery technique according to this disclosure using a spectral analysis operation, such as a Discrete Fourier Transform operation, to both detect the servo preamble signal and determine its phase error. The phase error is updated as long as the servo preamble signal is being detected, for use in the interpolation process.

Specifically, in some implementations of the subject matter of this disclosure, Discrete Fourier Transforms (DFTs) of a certain number, N, of samples from the disk drive read channel are computed. The number, N, of samples may be less than the length of the servo preamble. Each successive DFT sampling window begins a number, d, of samples after the beginning of the previous sampling window, where d<N. That is, the N-sample-wide sampling window is slid by d samples for each DFT to be computed. Therefore, each sample window overlaps by N-d samples. The smaller number, d, may represent an integral number of periods (i.e., one or more complete periods) of the preamble frequency, which is known.

The sample windows may be indexed by i. For the ith sample window, from the corresponding DFT ($DFT_i$), one may compute the total energy $E(i)$, the energy $E_{pre}(i)$ at the preamble frequency, and a phase angle $\theta_i$. A ratio $r_i=E(i)/E_{pre}(i)$ may then be determined and compared to a threshold $r_{thr}$, which is a predetermined number between 0 and 1. If $r_i \geq r_{thr}$, then the ith sample window may be considered to be qualified as being within the preamble, and may be assigned a qualification flag value $q_i=1$; otherwise the ith sample window is assigned $q_i=0$.

In some implementations, once $q_i=1$ for three successive sample windows, the read head may be deemed to be within the preamble (in other implementations, a different number of sample windows with $q_i=1$ may be required to deem the read head to be within the preamble). At that point, if the then-current sample window (i.e., in this implementation, the third sample window for which $q_i=1$) is the Kth sample window, meaning that $q_{K-3}=0$, $q_{K-2}=1$, $q_{K-1}=1$ and $q_K=1$, then an accumulated phase angle $\theta_{acc}(K)$ may be set to the phase angle $\theta_{K-1}$ of the previous sample window, and that accumulated phase angle $\theta_{acc}(K)$ may be used as the ZPS initial phase for interpolation in the current iteration of the timing recovery loop.

For each subsequent sample window for which $q_i=1$, the accumulated phase angle may be updated using the previous accumulated phase angle and the previous sampled phase angle. Thus, if the new current sample window is the (K+1)th sample window, meaning that $q_{K-2}=1$, $q_{K-1}=1$, $q_K=1$ and $q_{K+1}=1$, then an accumulated phase angle $\theta_{acc}(K+1)$ may be computed from $\theta_{acc}(K)$ and $\theta_K$. There may be more than one way to compute $\theta_{acc}(K+1)$ from $\theta_{acc}(K)$ and $\theta_K$, but in one implementation, where bw is a number between 0 and 1 representing the loop bandwidth, then:

$$\theta_{acc}(K+1)=\theta_{acc}(K)+((\theta_K-\theta_{acc}(K))\times(1-bw))$$

This equation is a low-complexity alternative to computing the average. When bw=0, $\theta_{acc}(K+1)=\theta(K)$, which discards all past observations and only keeps the current observation, and corresponds to infinite bandwidth. When bw=1, $\theta_{acc}(K+1)=\theta_{acc}(K)$, which corresponds to zero bandwidth. bw may also have any fractional value between 0 and 1.

This computed accumulated phase angle $\theta_{acc}(K+1)$ may be used as the ZPS initial phase for interpolation in the next iteration of the timing recovery loop.

Iterations of the timing recovery loop may continue with new phase angles $\theta_i$ until the occurrence of a predetermined number of successive sample windows for which $q_i=0$. At that point, the read head may be deemed to have exited the servo preamble. In one implementation, the predetermined number is 1—i.e., as soon as $q_i=0$ for one sample window, the read head is deemed to have exited the servo preamble (in other implementations, a different number of sample windows with $q_i=0$ may be required to deem the read head to have exited the preamble). By then, the timing recovery loop would be expected to have recovered the servo write frequency so that the servo data may be read and the servo sync mark may be detected.

Using implementations of the subject matter of this disclosure to start the timing loop may shorten the minimum preamble length required for the timing loop to converge, thereby reduced timing latency. Moreover, the possibility of timing updates outside the servo preamble may be reduced or eliminated. In part, the preamble length is shortened because the DFT operation is a feed-forward operation from digitized read samples into the interpolation stage, replacing a feedback operation from output of the interpolation stage. In some implementations, when the drive switches from startup mode to steady-state operating mode, the timing loop reverts to feedback mode, because preamble locations are known, so the DFT-based preamble detector is not needed. Such a switch may be made after a certain number of servo sync marks have been found. The number depends on the drive controller design, and can vary from only one SSM found, to all SSMs found, and anywhere in between.

Figure 4:
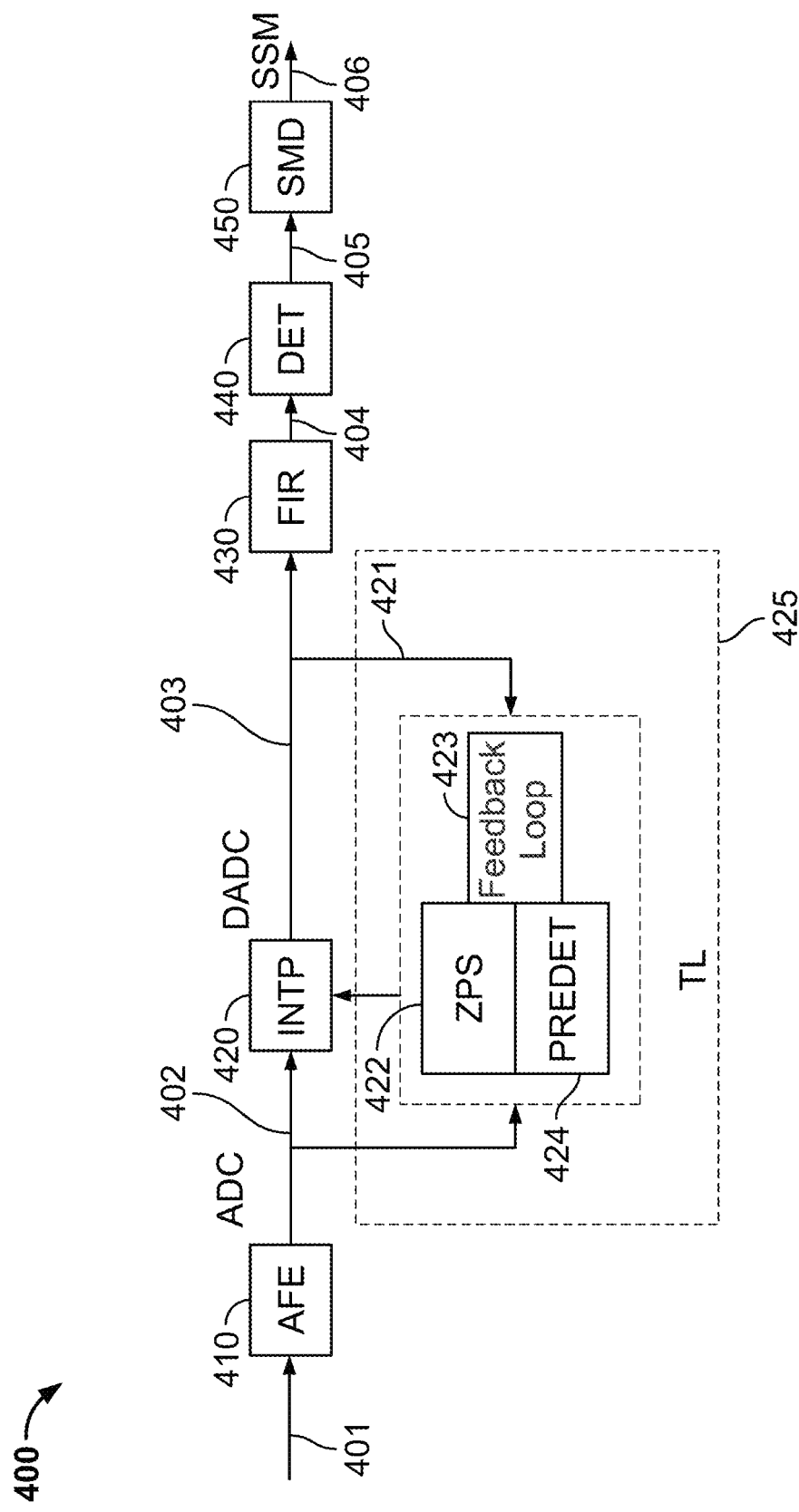
FIG. 4 is a block diagram of circuitry in the hard drive controller of FIG. 3 for implementing digital timing recovery in accordance with implementations of the subject matter of this disclosure.

FIG. 4 is a block diagram of circuitry 400 in read channel 301 in accordance with implementations of the subject matter of this disclosure, including circuitry for locating servo sync marks, which includes digital timing recovery. Circuitry 400 includes an analog front end (AFE) 410 which filters the analog signal 401 from the read head and incorporates an analog-to-digital converter (not shown) to sample and output a digitized filtered read head signal (ADC) 402, which is a stream of digitized samples. Interpolation circuitry (INTP) 420, which may resemble typical read channel interpolation circuitry, inputs ADC signal 402 at the sampling rate of AFE/ADC 410 and outputs DADC signal 403, which has been resampled at a rate based on timing recovery as discussed below. DADC signal 403 is filtered by finite impulse response (FIR) equalizer 430 into signal 404, which is decoded by detector (DET) 440 into "user" bits 405. User bits 405 are searched by sync mark detector (SMD) 450 to find the servo sync mark (SSM) 406 for the particular servo wedge being processed, after which timing adaptation ends, until the next servo wedge is encountered.

During normal, or steady-state, run-time operation, where the locations of the servo wedges, and therefore the servo preambles, have been established, the phase error for interpolation circuitry (INTP) 420 may be determined in a typical feedback loop 421, jump started by a phase error estimate from Zero Phase Start circuitry 422. Feedback loop circuitry 423 determines the error e between INTP output DADC and the actual output, and then updates the phase, $\varphi$, at each time t as follows:

$$\varphi(t+1)=\varphi(t)+\mu e$$

where $\mu$ is a loop constant of timing loop (TL) 425.

However, during start-up operation, where the locations of the servo wedges are unknown, the phase error for interpolation circuitry (INTP) 420 may be determined using preamble-detect circuitry (PREDET) 424, which may be hardwired circuitry, or a suitable processor or firmware, configured to determine the phase error as described above and as shown in FIGS. 5 and 6.

Figure 5:
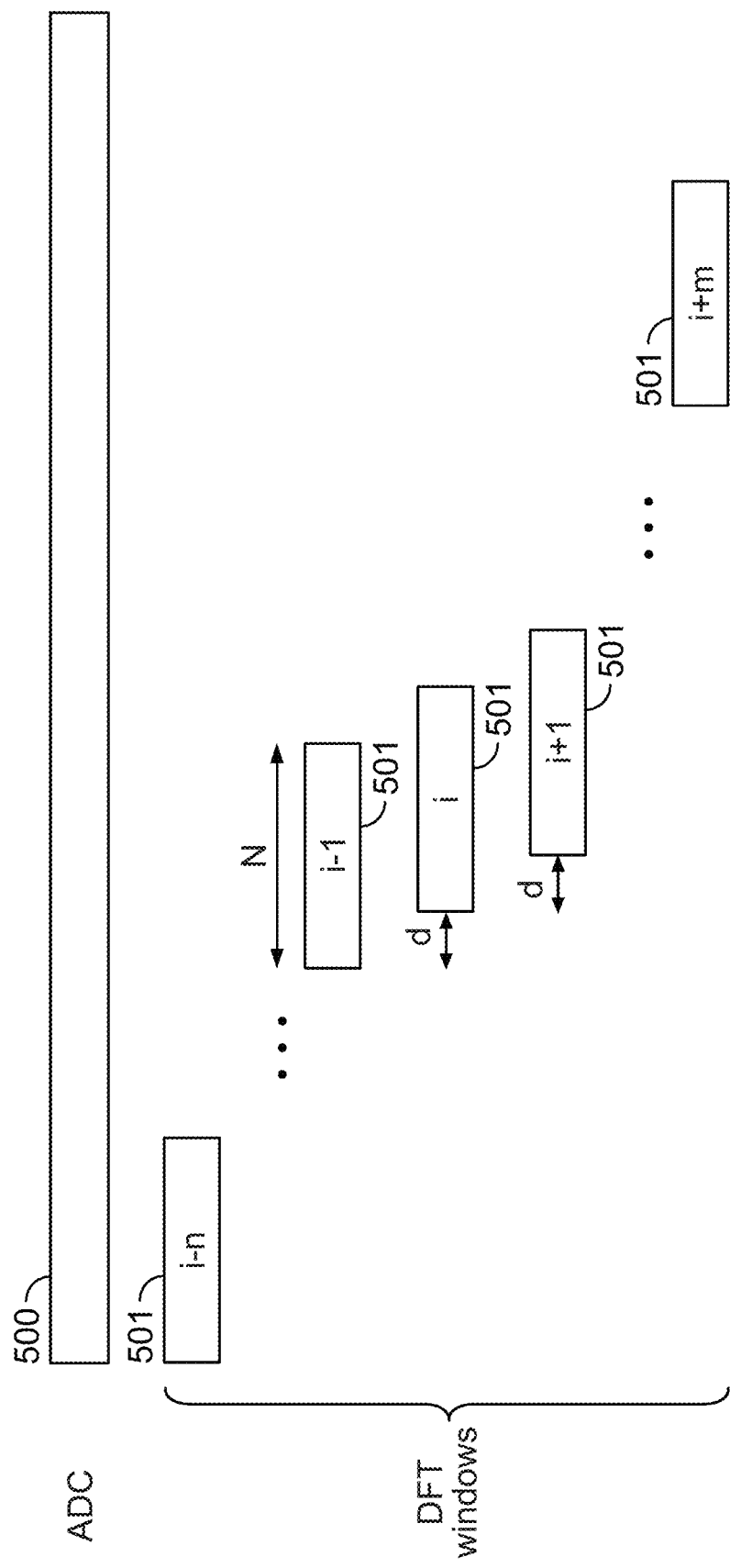
FIG. 5 is an illustration of the relationship, in accordance with implementations of the subject matter of this disclosure, of sample windows to one another.

FIG. 5 shows how the DFT sampling windows 501 are applied to a stream 500 of digitized samples 402 from the hard disk drive read channel 300. Each DFT sampling window 501 is N samples wide, and begins d samples after the beginning of the previous window 501. As discussed above, the number, N, of samples in each DFT sampling window 501 may be less than the length of the servo preamble. Each successive DFT sampling window 501 begins a number, d, of samples after the beginning of the previous DFT sampling window 501, where d<N. That is, the N-sample-wide DFT sampling window 501 is slid by d samples for each DFT to be computed. Therefore, each sample window overlaps by N−d samples. The smaller number, d, may represent an integral number of periods (i.e., one or more complete periods) of the preamble frequency, which is known.

As shown, the ith DFT sampling window 501 begins d samples after the (i−1)th DFT sampling window 501, and d samples before the (i+1)th DFT sampling window 501. The (i−n)th DFT sampling window begins nd samples before the ith DFT sampling window 501, while (i+m)th DFT sampling window begins md samples before the ith DFT sampling window 501.

Figure 6:
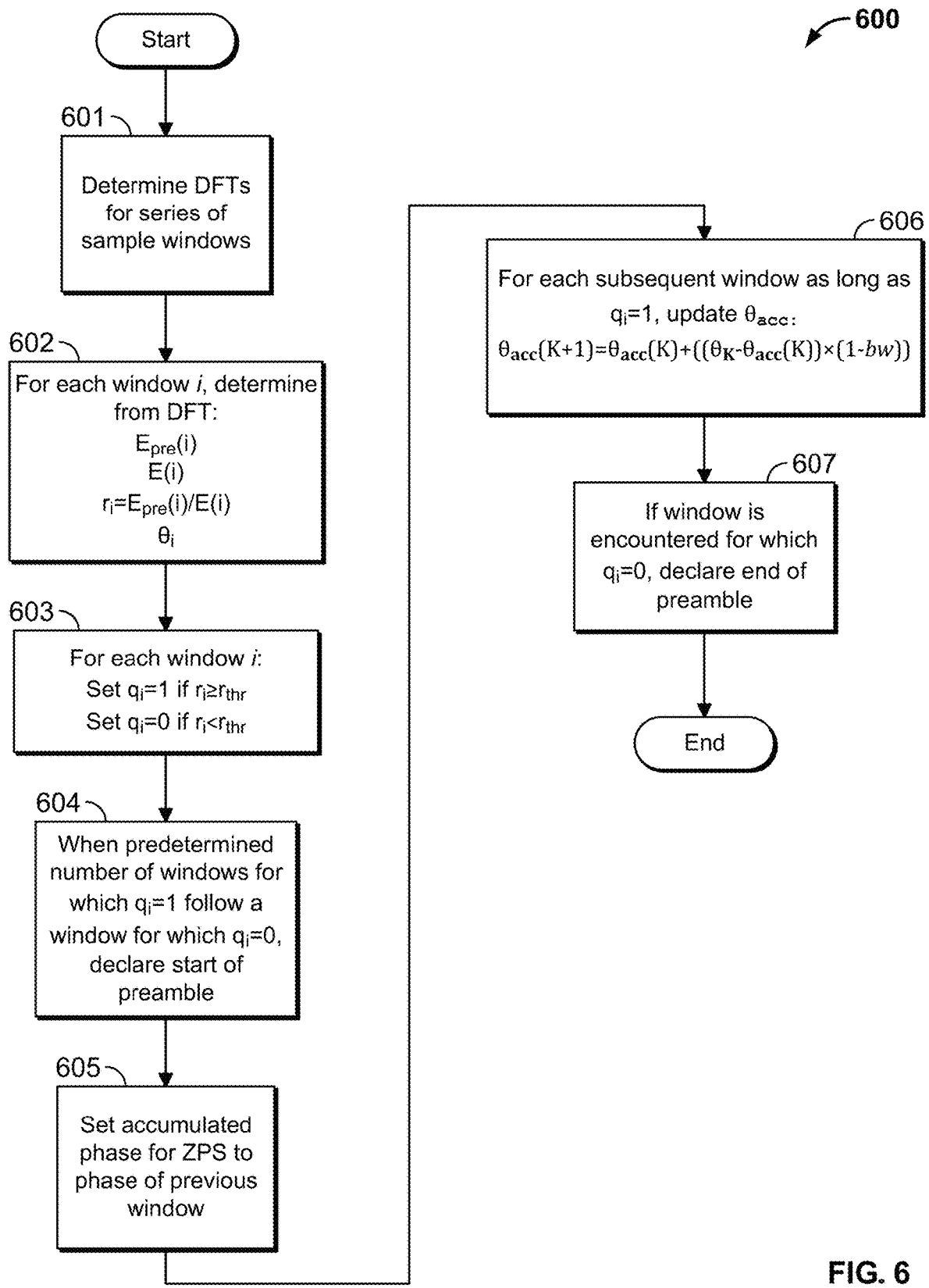
FIG. 6 is a flow diagram illustrating the operation of circuitry in accordance with implementations of the subject matter of this disclosure.

Preamble detect circuitry (PREDET) 424 operates on DFT sampling windows 501 according to the method 600 shown in FIG. 6. At 601, PREDET 424 determines DFTs for each DFT sampling window 501 in the series of DFT sampling windows 501. At 602, for each ith DFT sampling window 501, PREDET 424 determines from the ith DFT (DFT$_i$) the values of the energy $E_{pre}(i)$ at the preamble frequency, the total energy E(i), the ratio $r_i=E(i)/E_{pre}(i)$, and the phase angle $\theta_i$. At 603, for each ith DFT sampling window 501, PREDET 424 sets the ith qualification flag $q_i$ to '1' if $r_i \geq r_{thr}$, and to '0' if $r_i < r_{thr}$.

At 604, after a first predetermined number of DFT sampling windows 501 have been found for which $q_i=1$, after at least one DFT sampling window 501 for which $q_i=0$, PREDET 424 deems the preamble to have been found—i.e., declares the start of the preamble. The value of the first predetermined number depends on the preamble length. In some implementations, where the preamble is shorter, the first predetermined number (of DFT sampling windows 501 for which $q_i=1$ that is needed to establish that the preamble has been found) may be, e.g., 3. However, in other implementations, where the preamble is longer, the first predetermined number may have a value to reduce the likelihood of a "false positive" detection of the preamble.

Once the preamble has been found, then at 605, PREDET 424 sets the accumulated phase angle $\theta_{acc}(K)$ for the current Kth DFT sampling window 501 to the phase angle $\theta_{K-1}$ of the previous DFT sampling window 501, and that accumulated phase angle $\theta_{acc}(K)$ may be used as the initial phase angle in Zero Phase Start circuitry 422 for the current iteration of the timing recovery loop.

At 606, as long as the preamble continues (i.e., as long as, for each DFT sampling window 501 that is sampled, $q_i=1$), the accumulated phase angle $\theta_{acc}$ is updated as follows (where K represents the most current sampling window for which $\theta_{acc}$ has already been computed):

$$\theta_{acc}(K+1)=\theta_{acc}(K)+((\theta_K-\theta_{acc}(K))\times(1-bw))$$

DFT sampling windows 501 continue to be sampled, and, at 607, if a second predetermined number of DFT sampling windows 501 are encountered for which $q_i=0$, then the end of the preamble is declared and method 600 ends, or returns to 604 to await the next occurrence of the first predetermined number of DFT sampling windows 501 are encountered for which $q_i=1$, signifying the start of the next servo preamble. In some implementations, the value of the second predetermined number (of DFT sampling windows 501 for which $q_i=0$ that is considered to signify the end of the servo preamble) may be 1 (as shown in FIG. 6 at 607). In other implementations, to allows some margin to prevent "false positive" detection of the end of the preamble in case of, e.g., corruption because of noise, the second predetermined number may have a higher value.

Figure 7:
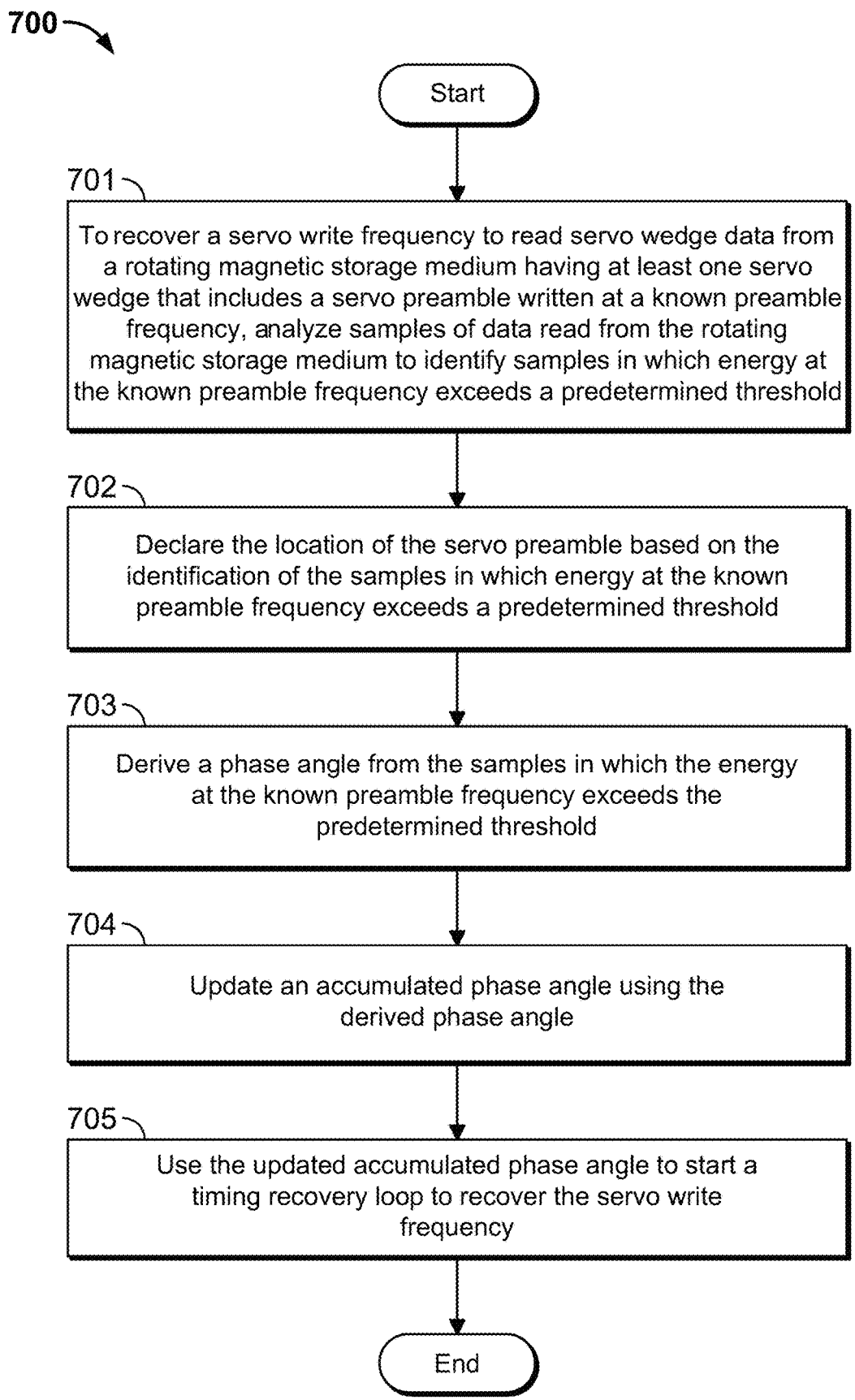
FIG. 7 is a flow diagram illustrating a method in accordance with implementations of the subject matter of this disclosure.

A method 700 according to implementations of the subject matter of this disclosure is diagrammed in FIG. 7. Method 700 begins at 701, where, to recover a servo write frequency to read servo wedge data from a rotating magnetic storage medium having at least one servo wedge that includes a servo preamble written at a known preamble frequency, samples of data read from the rotating magnetic storage medium are analyzed to identify samples in which energy at the known preamble frequency exceeds a predetermined threshold. At 702, the location of the servo preamble is declared based on the identification of the samples in which energy at the known preamble frequency exceeds a predetermined threshold. At 703, a phase angle is derived from the samples in which the energy at the known preamble frequency exceeds the predetermined threshold. At 704, an accumulated phase angle is updated using the derived phase angle. At 705, the updated accumulated phase angle is used to start a timing recovery loop to recover the servo write frequency. Method 700 then ends.

Thus it is seen that a digital timing recovery technique for hard disk drive servo operations during start-up mode, in which the possibility of non-convergence before the servo preamble ends is reduced or eliminated, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of recovering a servo write frequency to read servo wedge data from a rotating magnetic storage medium having at least one servo wedge that includes a servo preamble written at a known preamble frequency, the method comprising:

analyzing samples of data read from the rotating magnetic storage medium to identify samples in which energy at the known preamble frequency exceeds a predetermined threshold;

declaring location of the servo preamble based on the identification of the samples in which energy at the known preamble frequency exceeds the predetermined threshold;

deriving a phase angle from the samples in which the energy at the known preamble frequency exceeds the predetermined threshold;

updating an accumulated phase angle using the derived phase angle; and using the updated accumulated phase angle to start a timing recovery loop to recover the servo write frequency.

2. The method of claim 1 wherein the analyzing and the deriving are performed using a spectral analysis operation.

3. The method of claim 2 wherein the spectral analysis operation comprises a Discrete Fourier Transform operation.

4. The method of claim 2 wherein the spectral analysis is performed on groups of samples grouped into overlapping windows, each window being shorter than the servo preamble.

5. The method of claim 4 wherein respective starting samples of adjacent overlapping windows are separated by an integral multiple of a period of the known preamble frequency.

6. The method of claim 1 wherein identifying the samples in which the energy at the known preamble frequency exceeds the predetermined threshold comprises, for each individual sample:

determining a total amount of energy in the individual sample;

determining, in the individual sample, an amount of energy at the servo preamble frequency in the individual sample; and comparing the amount of energy at the servo preamble frequency in the individual sample to the total amount of energy in the individual sample.

7. The method of claim 6 wherein comparing the amount of energy at the servo preamble frequency to the total amount of energy in the individual sample comprises:

determining a ratio of the amount of energy at the servo preamble frequency to the total amount of energy in the individual sample; and comparing the ratio to a predetermined threshold.

8. The method of claim 6 wherein declaring the location comprises observing a first predetermined number of consecutive samples for which the ratio at least equals the predetermined threshold.

9. The method of claim 8 further comprising declaring an end of the servo preamble upon observing a second predetermined number of consecutive samples for which the ratio is less than the predetermined threshold.

10. The method of claim 1 wherein updating an accumulated phase angle using the derived phase angle comprises adding to the accumulated phase angle a weighted difference between the derived phase angle and the accumulated phase angle.

11. The method of claim 10 wherein the difference between the derived phase angle and the accumulated phase angle is weighted by a loop constant.

12. A storage device, comprising:
a rotating magnetic storage medium having at least one servo wedge that includes a servo preamble written at a known preamble frequency; and
a read channel controller configured to recover a servo write frequency for reading servo wedge data from the rotating magnetic storage medium, the read channel controller comprising:
circuitry configured to analyze samples of data read from the rotating magnetic storage medium to identify samples in which energy at the known preamble frequency exceeds a predetermined threshold;
circuitry configured to declare location of the servo preamble based on the identification of the samples in which energy at the known preamble frequency exceeds the predetermined threshold;
circuitry configured to derive a phase angle from the samples in which the energy at the known preamble frequency exceeds the predetermined threshold;
circuitry configured to update an accumulated phase angle using the derived phase angle; and
circuitry configured to use the derived phase angle to start a timing recovery loop to recover the servo write frequency.

13. The storage device of claim 12 wherein the circuitry configured to analyze and the circuitry configured to derive are configured to perform a spectral analysis operation.

14. The storage device of claim 13 wherein the circuitry configured to analyze and the circuitry configured to derive are configured to perform a Discrete Fourier Transform operation.

15. The storage device of claim 13 wherein the circuitry configured to analyze and the circuitry configured to derive are configured to perform the spectral analysis on groups of samples grouped into overlapping windows, each window being shorter than the servo preamble.

16. The storage device of claim 15 wherein the circuitry configured to analyze and the circuitry configured to derive are configured to perform the spectral analysis on groups of samples grouped into overlapping windows, respective starting samples of adjacent overlapping windows being separated by an integral multiple of a period of the known preamble frequency.

17. The storage device of claim 12 wherein the circuitry configured to analyze samples of data read from the rotating magnetic storage medium to identify samples in which energy at the known preamble frequency exceeds a predetermined threshold is configured to, for each individual sample:
determine a total amount of energy in the individual sample;
determine, in the individual sample, an amount of energy at the servo preamble frequency; and
compare the amount of energy at the servo preamble frequency in the individual sample to the total amount of energy in the individual sample.

18. The storage device of claim 17 wherein circuitry configured to analyze samples of data read from the rotating magnetic storage medium to identify samples in which energy at the known preamble frequency exceeds a predetermined threshold is configured to compare the amount of energy at the servo preamble frequency in the individual sample to the total amount of energy in the individual sample by:
determining a ratio of the amount of energy at the servo preamble frequency in the individual sample to the total amount of energy in the individual sample; and
comparing the ratio to a predetermined threshold.

19. The storage device of claim 17 wherein the circuitry configured to declare the location of the servo preamble based on the identification of the samples in which energy at the known preamble frequency exceeds a predetermined threshold is configured to observe a first predetermined number of consecutive samples for which the ratio at least equals the predetermined threshold.

20. The storage device of claim 19 wherein the read channel controller further comprises circuitry configured to declare an end of the servo preamble upon observing a second predetermined number of consecutive samples for which the ratio is less than the predetermined threshold.

21. The storage device of claim 12 wherein the circuitry configured to update the accumulated phase angle using the derived phase angle is configured to add to the accumulated phase angle a weighted difference between the derived phase angle and the accumulated phase angle.

22. The storage device of claim 21 wherein the circuitry configured to update the accumulated phase angle using the derived phase angle is configured to add to the accumulated phase angle a difference, between the derived phase angle and the accumulated phase angle, that is weighted by a loop constant.

* * * * *